(12) United States Patent
Komine (10) Patent No.: US 6,886,835 B2
(45) Date of Patent: May 3, 2005

(54) CLAMP NUT AND COLLET CHUCK

(75) Inventor: Tsuyoshi Komine, Hyogo (JP)

(73) Assignee: Big Alpha Co., Inc., Hyogo (JP)

( * ) Notice: Subject to any disclaimer, the term of this patent is extended or adjusted under 35 U.S.C. 154(b) by 202 days.

(21) Appl. No.: 10/198,642

(22) Filed: Jul. 17, 2002

(65) Prior Publication Data

US 2003/0132580 A1 Jul. 17, 2003

(30) Foreign Application Priority Data

Jan. 11, 2002 (JP) ........................................ 2002-004873

(51) Int. Cl.[7] .............................................. B23B 3/120
(52) U.S. Cl. ............................................ 279/42; 279/52
(58) Field of Search .............................. 279/38, 42, 52, 279/53, 56, 157, 48, 69

(56) References Cited

U.S. PATENT DOCUMENTS

| | | | | |
|---|---|---|---|---|
| 4,047,722 A | * | 9/1977 | Nielsen et al. .............. 279/19.5 |
| 4,496,163 A | * | 1/1985 | Bernfeld ...................... 279/145 |
| 4,516,787 A | * | 5/1985 | Venable ...................... 279/2.02 |
| 4,571,526 A | * | 2/1986 | Wesselink ..................... 315/56 |
| 4,793,201 A | * | 12/1988 | Kanai et al. ................ 74/89.43 |
| 4,795,292 A | * | 1/1989 | Dye ............................ 409/136 |
| 4,817,972 A | * | 4/1989 | Kubo .......................... 279/42 |
| 5,524,909 A | * | 6/1996 | Wyatt .......................... 279/50 |
| 5,601,386 A | * | 2/1997 | Wells .......................... 408/57 |
| 5,716,057 A | | 2/1998 | Wright, Jr. et al. |
| 5,941,664 A | * | 8/1999 | Morsch ....................... 409/131 |
| 6,315,507 B1 | * | 11/2001 | Podlipec et al. ............ 409/234 |
| 6,473,954 B1 | * | 11/2002 | Rosberg et al. ............... 29/243 |

FOREIGN PATENT DOCUMENTS

| | | |
|---|---|---|
| DE | 41 15 992 A1 | 11/1992 |
| DE | 296 12 328 U1 | 9/1996 |
| GB | 857 495 | 2/1958 |
| JP | 5-86407 | 4/1993 |

* cited by examiner

*Primary Examiner*—Daniel W. Howell
(74) *Attorney, Agent, or Firm*—Wolf, Greenfield & Sacks, P.C.

(57) ABSTRACT

The present invention enhances the lubricating property of the sliding surfaces of a clamp nut and a collet, reduces a friction coefficient, prevents the occurrence of seizure, and enhances durability. Accordingly, it is possible to rotate the clamp nut and the collet without causing vibrations due to imbalance. Moreover, this invention provides a clamp nut that can maintain tool-mounting accuracy for a long period of time even in the case of high-speed rotation, and also provides a collet chuck including such clamp nut. Concerning the clamp nut which is mounted on a collet chuck body for holding tools in the collet and which clamps the collet chuck body and the collet together, at least a part of the clamp nut which comes in contact with the collet is made of oil-bearing metal.

20 Claims, 10 Drawing Sheets

CLAMP NUT AND COLLET CHUCK

BACKGROUND OF THE INVENTION

1. Field of the Invention

The present invention relates to a clamp nut which is mounted on a collet chuck body for holding tools in a collet, and which clamps the collet chuck body and the collet together. This invention also relates to a collet chuck including this clamp nut.

2. Description of the Related Art

A collet chuck has been used which is designed to hold a cutting tool by causing a collet to engage with a tapered hole in the top end of the chuck body provided on a machine tool and by using a clamp nut to clamp the cutting tool mounted on the collet, thereby causing the diameter of the collet to contract.

There is one type of such collet chuck in which a thrust ring and a nut body are integrated with each other so that the diameter of the clamp nut is made smaller in order to attain satisfactory balance. However, concerning the collet chuck having this configuration, heavy stress is exerted between the collet and the clamp nut, and seizure tends to occur. Accordingly, it is difficult to maintain tool-mounting accuracy.

Consequently, a collet chuck is suggested which prevents the occurrence of seizure by placing a thrust ball between a nut body and a thrust ring, which is placed between the nut body and a collet, thereby reducing a friction coefficient between the thrust ring and the nut body. Moreover, Japanese Utility Model Laid-Open (Kokai) Publication No. HEI 5-86407 discloses a collet chuck in which a low-friction mechanism is interposed between a front tapered part of a collet and a tapered surface of a clamp nut. Examples of this suggested low-friction mechanism include: a taper roller provided in a freely rotatable manner; a tapered disk with a low-friction surface; or the use of a low-friction material at least over a tapered surface of the clamp nut, a tapered disk, a taper roller, or the surface of a front tapered part of the collet.

However, concerning the collet chuck provided with the thrust ball or the taper roller as the low-friction mechanism, there is a possibility that balance would become worse due to deviation of an insertion opening position for the ball or the roller, or deviation of the ball or the roller placed in the collet chuck. Accordingly, there is a possibility that vibrations may tend to occur at the time of high-speed rotation. There is also the problem of high manufacturing costs.

Concerning the collet chuck provided with the low-friction mechanism by placing the tapered disk with the low-friction surface or by using the low-friction material at least over the tapered surface of the clamp nut, the tapered disk, the taper roller, or the surface of the front tapered part of the collet, low friction is suggested, but no consideration is given to the enhancement of lubricating property by constructing the above-mentioned parts by using a material with excellent lubricating property.

SUMMARY OF THE INVENTION

The present invention aims at improving the above-described conventional clamp nut and collet chuck. It is an object of this invention to provide a clamp nut and a collet chuck with the clamp nut, which exhibit-the enhanced lubricating property of the sliding surfaces of the clamp nut and the collet, which exhibit a low friction coefficient, which prevent the occurrence of seizure, which exhibit enhanced durability, which exhibit satisfactory balance and generate no vibrations due to an offset load even at the time of high-speed rotation, and which are capable of maintaining the tool-mounting accuracy for a long period of time.

In order to achieve this object, this invention provides a clamp nut which is mounted on a collet chuck body for holding a tool in a collet and which clamps the collet chuck body and the collet together, wherein at least a part of the clamp nut in contact with the collet is made of a porous material, and pores of the porous material are filled with a fluid.

When the clamp nut having the above-described configuration is mounted on the collet chuck body and is rotated to begin clamping the collet, it is possible to enhance the lubricating property of the sliding surfaces of the clamp nut and the collet and to reduce a friction coefficient. Accordingly, it is possible to prevent the occurrence of seizure on the sliding surfaces or the abrasion of the sliding surfaces and to enhance the durability. Moreover, since a twisting force is not applied to the collet at the time of clamping the collet, it is possible to enhance the tool-mounting accuracy. As the lubricating property of the sliding surfaces of the clamp nut and the collet is enhanced, the clamp nut and the collet tend to easily slide along each other, thereby facilitating the turning of the clamp nut on the collet chuck body. Therefore, it is possible to further enhance tool-clamping force.

The fluid can be injected into the pores. Alternatively, the fluid can be injected from the external surface of the clamp nut at the time of clamping the clamp nut.

Moreover, the fluid can be composed of lubricating oil. The fluid can be a gas or a liquid.

The clamp nut of this invention can be made of a porous material in its entirety and can be constructed in a manner such that pores of the porous material are filled with the fluid.

Specifically, since the porous material with the pores filled with the fluid can realize hardness of HRC 50 or more, even if the entire clamp nut is made of this porous material, it is possible to make it sufficiently function as the clamp nut. Moreover, by constructing the entire clamp nut using the porous material, it is possible to reduce the diameter of the clamp nut and to reduce factors which cause imbalance. Accordingly, it is possible to prevent vibrations caused by high-speed rotation. Even if the clamp nut wears out, the lubricating property will always exist.

Moreover, the clamp nut of this invention can comprise a nut body and a thrust ring provided between the collet and the nut body, wherein at least a part of the thrust ring in contact with the collet can be made of the porous material, and pores of the porous material can be filled with the fluid.

Furthermore, the entire thrust ring can be made of the porous material, and the pores of the porous material can be filled with the fluid.

The nut body can be mounted in a manner capable of rotating and sliding on the thrust ring. Alternatively, the nut body may be formed in a manner integrated with the thrust ring.

This invention also provides a collet chuck which comprises a collet chuck body for holding a tool in a collet, and a clamp nut having the above-described configuration.

Since the collet chuck having this configuration includes the clamp nut having the above-described configuration, it is possible to enhance the lubricating property of the sliding surfaces of the clamp nut and the collet and to reduce the friction coefficient. Accordingly, it is possible to prevent the occurrence of seizure on the sliding surfaces and to enhance durability. Moreover, it is possible to enhance the tool-mounting accuracy and tool-clamping force.

DETAILED DESCRIPTION OF THE PREFERRED EMBODIMENTS

A clamp nut and a collet chuck with the clamp nut according to preferred embodiments of this invention are hereinafter described with reference to the attached drawings. In these embodiments, the tool insertion side is referred to as the "top-end" side, and the opposite side is referred to as the "base-end" side.

(Embodiment 1)

Figure 1:
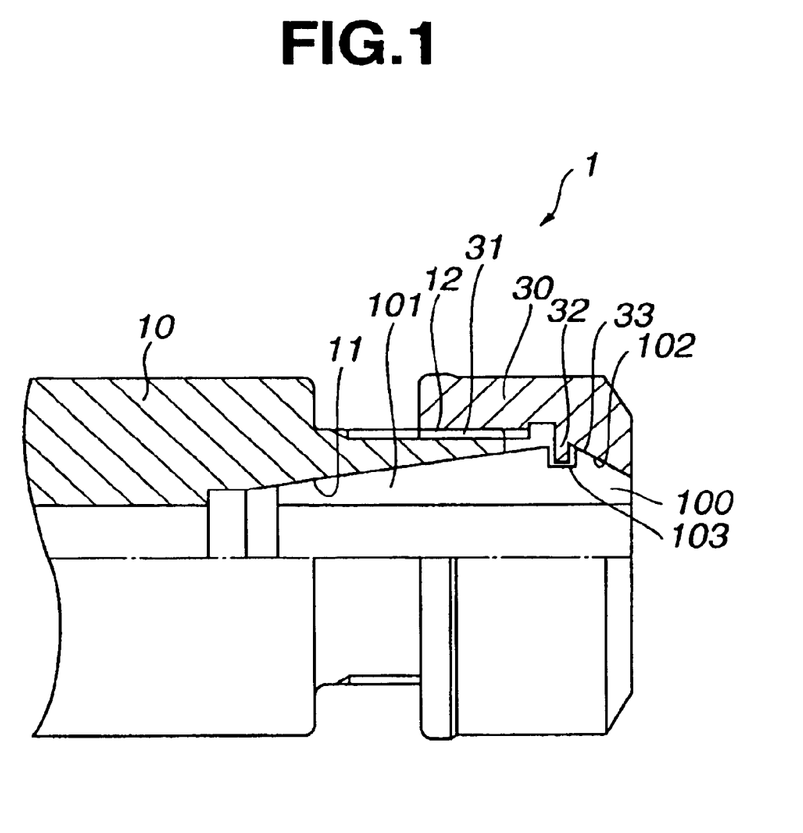
FIG. 1 is a partially sectional view of a collet chuck with a clamp nut according to Embodiment 1 of the present invention.

FIG. 1 is a partially sectional view of a collet chuck with a clamp nut according to Embodiment 1 of this invention.

A collet chuck 1 of Embodiment 1 comprises a collet chuck body 10 and a clamp nut 30 mounted on the collet chuck body 10.

In the collet chuck body 10 is formed a tapered hole 11, the diameter of which becomes gradually smaller from its top-end side toward its base-end side. A tapered collet 100 is inserted in this tapered hole 11. On the outer surface of the collet chuck body 10 on the top-end side is formed a screw part 12 for engaging with a screw part 31 formed on the inner surface of a clamp nut 30 as described below. As the clamp nut 30 externally engages with and clamps the collet chuck body 10, the collet chuck body 10 contracts the diameter of the tapered collet 100 inserted in the tapered hole 11, thereby firmly securing a tool held in the tapered collet 100.

This tapered collet 100 has a plurality of slots 101 cut in the axial direction alternately from the top-end side and from the base-end side. These slots 101 enable the tapered collet 100 to expand or contract its diameter by means of elastic deformation, thereby releasing or holding the shank of a tool in a desired manner. The outer surface of the tapered collet 100 on the top-end side is a tapered surface 102 formed so as to make its diameter smaller toward the top-end side. An annular groove 103 is formed adjacent to the base-end side of the tapered surface 102. This annular groove 103 engages with an engaging convex part 32 formed on the inner surface of the clamp nut 30, with play.

The clamp nut 30 is entirely made of "oil-bearing metal" which is obtained by filling pores of a porous material with lubricating oil (the porous material with its pores filled with lubricating oil will be hereinafter referred to as the "oil-bearing metal"). In Embodiment 1, among metallic porous materials, tool steel materials and high speed steel materials are used, and lubricating oil is injected into the pores of the porous materials in a vacuum. The clamp nut 30 made of this oil-bearing metal has a hardness of HRC 50 or more (specifically, about HRC 50 to 65 in Embodiment 1). Even if the entire clamp nut 30 is made of the oil-bearing metal, it can sufficiently perform its functions as the clamp nut. Moreover, since the lubricating property is enhanced, it is possible to reduce a friction coefficient against the tapered collet 100 to approximately 0.1 to 0.2.

On the inner-surface of the clamp nut 30 on the base-end side is formed a screw part 31 for engaging with the screw part 12 formed on the outer surface of the collet chuck body 10. Moreover, on the inner surface of the clamp nut 30 on the top-end side is formed a tapered surface 33 which is complementary to the tapered surface 102 of the tapered collet 100 and which is formed so as to make its inside diameter gradually become smaller toward the top-end side. On the base-end side of this tapered surface 33 is formed an engaging convex part 32 which engages with the annular groove 103 in the tapered collet 100, with play.

Specific actions of the collet chuck 1 according to Embodiment 1 are hereinafter described.

In order to cause the collet chuck 1 to hold a tool which is not shown in the drawings, the clamp nut 30 is attached to the top end of the tapered collet 100 by contracting the diameter of the tapered collet 100. The tapered collet 100 with the clamp nut 30 mounted thereon is then inserted into the tapered hole 11 of the collet chuck body 10, and the clamp nut 30 is temporarily clamped on the top-end side of the collet chuck body 10. Subsequently, as the shank (not shown in the drawings) of the tool is inserted into the tapered collet 100 and the clamp nut 30 is rotated (or screwed), the tapered surface 33 of the clamp nut 30 is pressed against the tapered surface 102 of the tapered-collet 100. As the width of the slots 101 becomes narrower, the diameter of the tapered collet 100 becomes smaller and the tapered collet 100 is pushed toward the base-end side of the tapered hole 11, thereby holding the shank of the tool. Since the clamp nut 30 is made of the oil-bearing metal, it is possible to enhance the lubricating property of the interface between both the tapered surfaces 33 and 102 and to reduce the friction coefficient. Accordingly, it is possible to prevent the occurrence of seizure between the tapered surfaces 102 and 33. Moreover, since the lubricating property of the screw part 31 is enhanced likewise, the clamp nut 30 can be easily clamped and it is possible to increase a moving force of the screw part 31 of the clamp nut 30 against the screw part 12 of the collet chuck body 10. Accordingly, it is possible to increase a force (or holding force) to clamp the tapered collet 100. As a result, it is possible to hold the tool more firmly and to enhance the tool-mounting accuracy.

The clamp nut 30 of Embodiment 1 does not use an independent thrust ring, but is constructed in a manner integrated with a thrust ring. Accordingly, the diameter of the clamp nut 30 can be made much smaller. Accordingly, it is possible to obtain further excellent balance at the time of rotation and to sufficiently cope with high-speed rotation. Moreover, even if the clamp nut wears out, the lubricating property will always exist.

Concerning Embodiment 1, the case in which the entire clamp nut 30 is made of the oil-bearing metal has been explained. However, without limitation to such configuration, at least a part of the clamp nut 30 in contact with (sliding around) the tapered collet 100 may be made of the oil-bearing metal.

Moreover, concerning Embodiment 1, the case in which the porous material with its pores previously filled with lubricating oil is used for the clamp nut 30 has been explained. However, without limitation to such configuration, it is possible to achieve similar effects to the above-described case by, for example, as shown in FIGS. 7 and 8, pouring lubricating oil from a lubricating oil supply device 130 into the pores of the porous material which composes the clamp nut 30 when the clamp nut 30 is clamped to the collet chuck body 10.

This lubricating oil supply device 130 comprises a substantially ring-shaped part 132 having the inner surface 131 which is complementary to the periphery of the clamp nut 30 and which can be pressed against the periphery of the clamp nut 30. The inner surface 131 of the substantially ring-shaped part 132 in connected to a lubricating oil supply path 133, which is connected to a lubricating oil supply source not shown in the drawing. When the clamp nut 30 is clamped to the collet chuck body 10, the lubricating oil supplied from the lubricating oil supply source passes through the lubricating oil supply path 133 and reaches the inner surface 131, and then is injected into the pores of the porous material which composes the clamp nut 30. Accordingly, it is possible to enhance the lubricating property between the tapered surfaces 33 and 102, to reduce the friction coefficient, and to prevent the occurrence of seizure between the tapered surfaces 33 and 102. Moreover, since the lubricating property of the screw part 31 is enhanced likewise, it is possible to increase the force (or holding force) to clamp the tapered collet 100. As a result, it is possible to hold the tool more firmly, and to enhance the tool-mounting accuracy.

Figure 7:
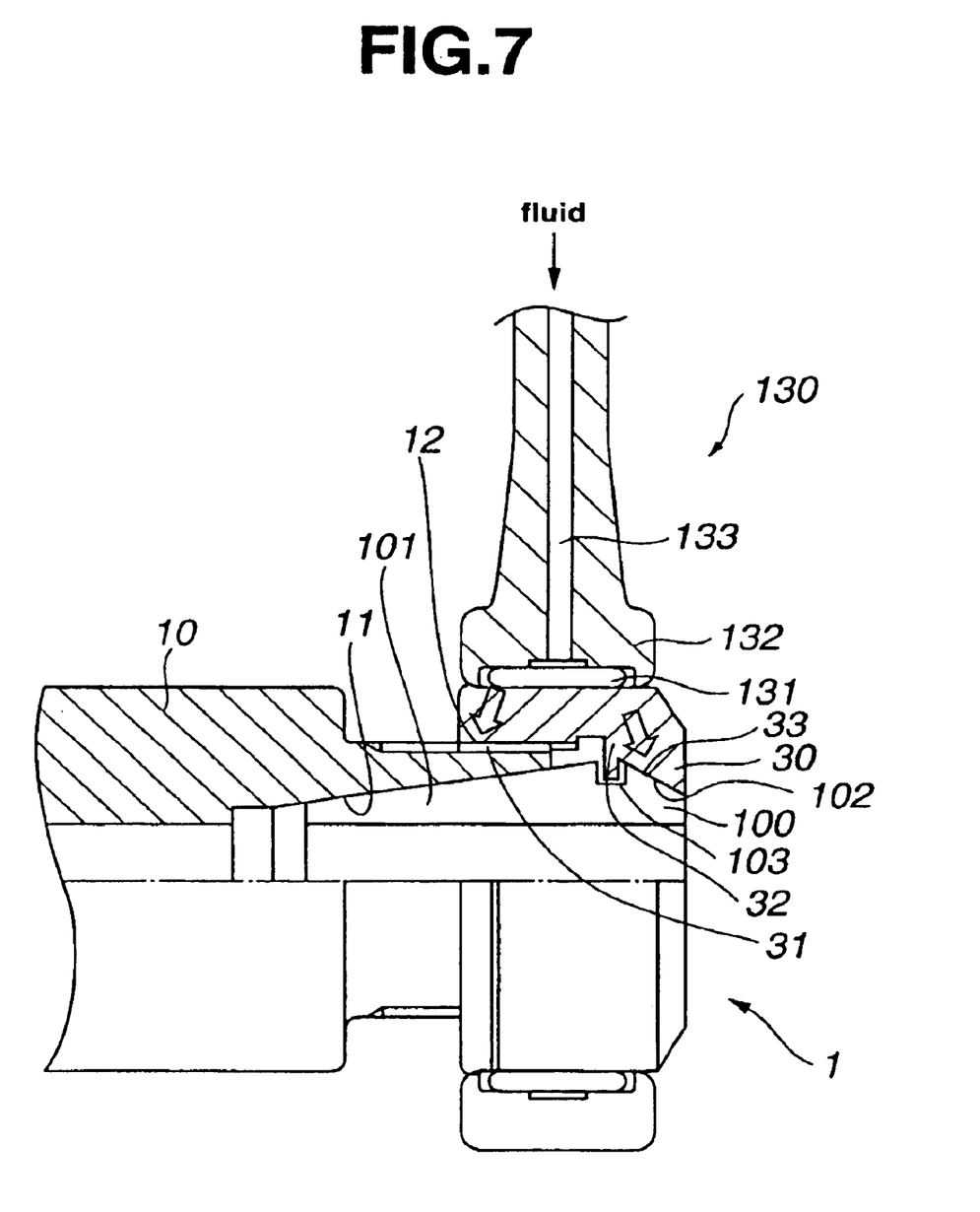
FIG. 7 is a partially sectional view of a collet chuck with a clamp nut according to another embodiment of the present invention and is illustrative of the state in which the clamp nut is clamped to the collet chuck body.
Figure 8:
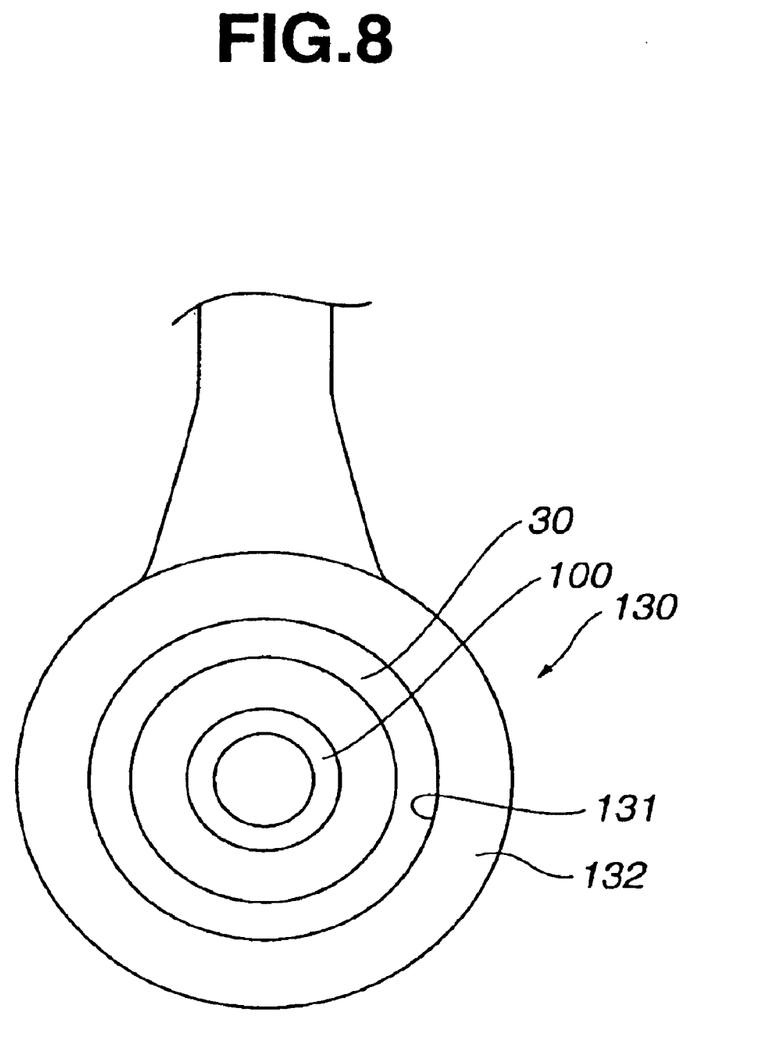
FIG. 8 is a right side view of the collet chuck of FIG. 7.

FIG. 7 is a partially sectional view of the collet chuck with the clamp nut according to this invention. FIG. 8 is a right side view of FIG. 7 in the state in which the clamp nut is clamped to the collet chuck body.

(Embodiment 2)

A clamp nut and a collet chuck with the clamp nut according to Embodiment 2 of this invention are hereinafter explained with reference to the relevant drawings. In Embodiment 2, elements similar to those of the collet chuck 1 described in Embodiment 1 are given the same reference numerals as in Embodiment 1, and any detailed description thereof is omitted.

Figure 2:
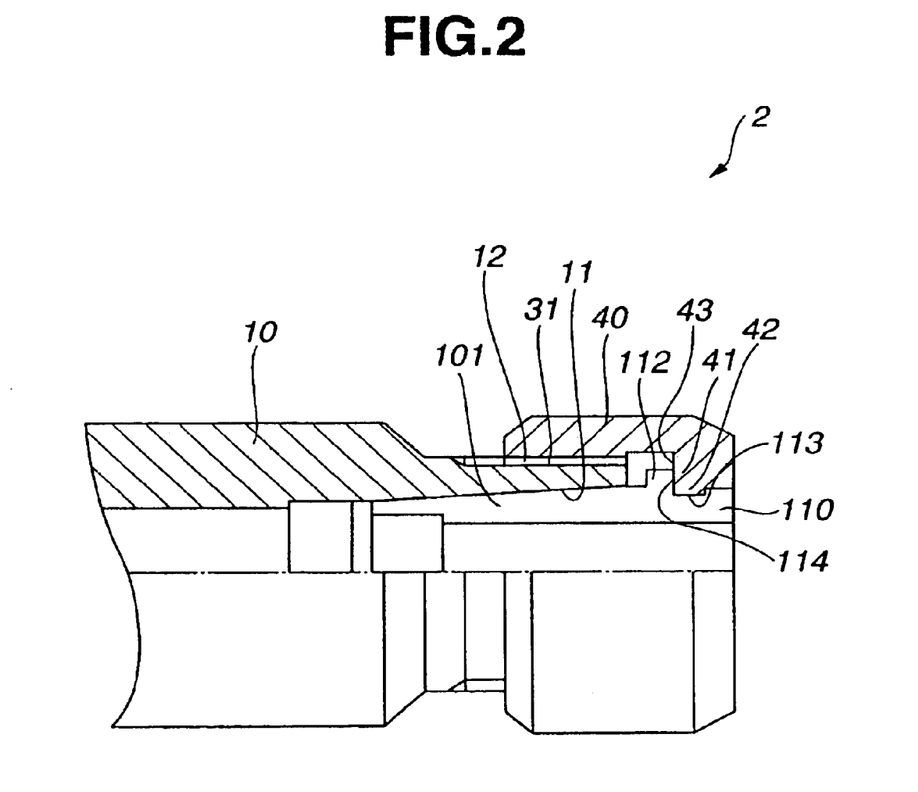
FIG. 2 is a partially sectional view of a collet chuck with a clamp nut according to Embodiment 2 of the present invention.

FIG. 2 is a partially sectional view of the collet chuck with the clamp nut according to Embodiment 2 of this invention.

As shown in FIG. 2, the main difference between a collet chuck 2 of Embodiment 2 and the collet chuck 1 of Embodiment 1 is the shape of a tapered collet 110 and the shape of a clamp nut 40.

Specifically, the tapered collet 110 of Embodiment 2 comprises a plurality of slots 101 cut in the axial direction alternately from the top-end side and from the base-end side, and a flange 112 is formed on the outer surface of the tapered collet 110 slightly off the top end thereof closer to the base-end side. Between the flange 112 and the top end of the tapered collet 110 is formed a shallow annular groove 113. Into this annular groove 113 is inserted a convex part 41 formed on the inner surface of the clamp nut 40 as described below in detail.

The clamp nut 40 is entirely made of the oil-bearing metal. On the inner surface of this clamp nut 40 on the base-end side is formed a screw part 31 for engaging with a screw part 12 formed on the outer surface of the collet chuck body 10. On the top-end side of the inner surface is formed a projection 41 projecting toward the inside so as to make the inside diameter of the clamp nut 40 smaller. On the base-end side of this projection 41 is formed a convex part 42 to be inserted into the annular groove 113 of the tapered collet 110. Moreover, such a structure is employed that a wall 43 formed on the base-end side of the projection 41 is brought into contact with a wall 114 on the top-end side of the flange 112 of the tapered collet.

Specific actions of the collet chuck 2 according to Embodiment 2 are hereinafter described.

In the same manner as in Embodiment 1 described above, the tapered collet 110 with the clamp nut 40 attached thereto is first caused to engage with the tapered hole 11 in the collet chuck body 10, and the clamp nut 40 is temporarily clamped to the collet chuck body 10. Subsequently, as the shank (not shown in the drawing) of the tool is inserted into the tapered collet 110 and the clamp nut 40 is rotated (or screwed), the wall 43 of the projection 41 of the clamp nut 40 presses the wall 114 of the flange 112 of the tapered collet 110. As the width of the slots 101 becomes narrower, the diameter of the tapered collet 110 becomes smaller and the tapered collet 110 is pushed toward the base-end side of the tapered hole 11. Since the clamp nut 40 is made of the oil-bearing metal, it is possible to enhance the lubricating property of the interface between the inner surface of the projection 41 and the outer surface of the tapered collet 110 on the top-end side and to reduce the friction coefficient. Accordingly, it is possible to prevent the occurrence of seizure between them. Moreover, since the lubricating property of the screw part 31 is enhanced likewise, the clamp nut 40 can be easily clamped and it is possible to increase a moving force of the screw part 31 of the clamp nut 40 against the screw part 12 of the collet chuck body 10. Accordingly, it is possible to increase the force (or holding force) to clamp the tapered collet 110. As a result, it is possible to hold the tool more firmly and to enhance the tool-mounting accuracy.

The clamp nut 40 of Embodiment 2, as in the case of Embodiment 1, does not use an independent thrust ring, but is constructed in a manner integrated with a thrust ring. Accordingly, the diameter of the clamp nut 40 can be made much smaller. Accordingly, it is possible to obtain further excellent balance at the time of rotation and to sufficiently cope with high-speed rotation.

Concerning Embodiment 2, the case in which the entire clamp nut 40 is made of the oil-bearing metal has been explained. However, without limitation to such configuration, at least a part of the clamp nut 40 in contact with the tapered collet 110 may be made of the oil-bearing metal.

Moreover, concerning Embodiment 2, the porous material with its pores previously filled with lubricating oil may be used for the clamp nut 40 as in the case of Embodiment 1. However, it is also possible to achieve effects similar to the above-described case by pouring lubricating oil from, for example, a lubricating oil supply device into the pores of the porous material which composes the clamp nut 40 when the clamp nut 40 is clamped to the collet chuck body 10.

(Embodiment 3)

A clamp nut and a collet chuck with the clamp nut according to Embodiment 3 of this invention are hereinafter explained with reference to the relevant drawings. In Embodiment 3, elements similar to those of the collet chucks described in the aforementioned embodiments are given the same reference numerals as in the aforementioned embodiments, and any detailed description thereof is omitted.

Figure 3:
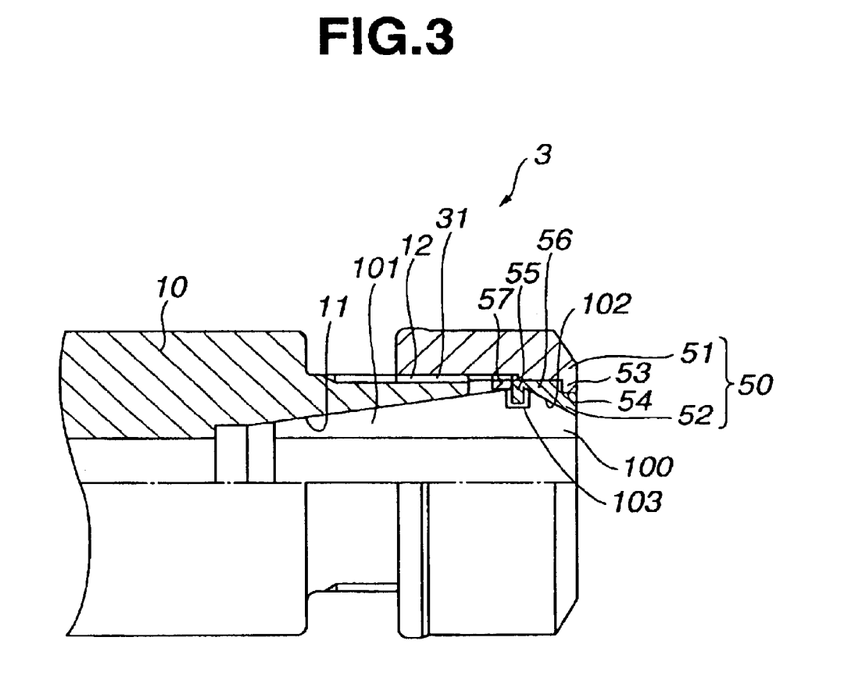
FIG. 3 is a partially sectional view of a collet chuck with a clamp nut according to Embodiment 3 of the present invention.

FIG. 3 is a partially sectional view of the collet chuck with the clamp nut according to Embodiment 3 of this invention.

As shown in FIG. 3, the main difference between a collet chuck 3 of Embodiment 3 and the collet chuck 1 of Embodiment 1 is the shape of a clamp nut 50. Specifically, the clamp nut 50 of Embodiment 3 comprises a nut body 51 and a thrust ring 52 provided between a tapered collet 100 and the nut body 51.

On the inner surface of the nut body 51 on the base-end side is formed a screw part 31 for engaging with a screw part 12 formed on the outer surface of a collet chuck body 10. The top-end side of the inner surface of the nut body 51 is formed as a projection 53 projecting toward the inside so as to make its inside diameter smaller. This projection 53 is located on a stepped part 54 formed at the top end of the thrust ring 52 as described below. Moreover, a part located almost in the center of the inner surface of the nut body 51 engages in a screwing manner with a nut 57 that contacts the end face of the thrust ring 52 on the base-end side, thereby securing the nut body 51 and the thrust ring 52.

The thrust ring 52 is entirely made of the aforementioned oil-bearing metal. On the base-end side of the thrust ring 52 is formed an engaging convex part 55 which projects toward the inside so as to make the inside diameter of the thrust ring 52 smaller and which engages with an annular groove 103 of the tapered collet 100, with play. The inner surface of the thrust ring 52 is formed as a tapered surface 56 which is complementary to a tapered surface 102 of the tapered collet 100 and which is formed so as to make the inside diameter smaller toward the top-end side. On the outer surface of the thrust ring 52 on the top-end side is formed a stepped part 54 which is complementary to the shape of the projection 53 of the nut body 51.

Specific actions of the collet chuck 3 of Embodiment 3 are hereinafter explained.

Firstly the thrust ring 52 and the nut body 51 are attached to the top end of the tapered collet 100 by contracting the diameter of the tapered collet 100. The tapered collet 100 with the thrust ring 52 and the nut body 51 mounted thereon is then inserted into the tapered hole 11 in the collet chuck body 10, and the thrust ring 52 and the nut body 51 are temporarily clamped to the collet chuck body 10. Subsequently, as the shank (not shown in the drawings) of the tool is inserted into the tapered collet 100 and the nut body 51 is rotated (or screwed), the projection 53 of the nut body 51 is pressed against the end face of the stepped part 54 of the thrust ring 52 on the top-end side. Accordingly, the tapered surface 56 of the thrust ring 52 presses the tapered surface 102 of the tapered collet 100. As the width of the slots 101 becomes narrower, the diameter of the tapered collet 100 becomes smaller and the tapered collet 100 is pushed toward the base-end side of the tapered hole 11. Since the thrust ring 52 is made of the oil-bearing metal, it is possible to enhance the lubricating property of the interface between both the tapered surfaces 56 and 102 and to reduce the friction coefficient. Accordingly, it is possible to prevent the occurrence of seizure between the tapered surfaces 102 and 56. As a result, it is possible to hold the tool more firmly and to enhance the tool-mounting accuracy.

Concerning Embodiment 3, the case in which the thrust ring 52 is entirely made of the oil-bearing metal has been described. However, without limitation to such configuration, at least a part of the thrust ring 52 in contact with the tapered collet 100 may be made of the oil-bearing metal.

Concerning Embodiment 3, the case in which the nut body 51 and the thrust ring 52 are separate units has been described. However, without limitation to such configuration, the nut body 51 may be integrated with the thrust ring 52, for example, by attaching them together with an adhesive or by press-fitting the thrust ring 52 in a specified position of the nut body 51.

Moreover, concerning Embodiment 3, the case in which the porous material with its pores previously filled with lubricating oil is used for the thrust ring 52 has been explained. However, without limitation to such configuration, it is possible to achieve effects similar to the above-described case by, for example, as shown in FIGS. 9 and 10, pouring lubricating oil from a lubricating oil supply device 140 into the pores of the porous material which composes the thrust ring 52 when the nut body 51 is clamped to the collet chuck body 10.

This lubricating oil supply device 140 comprises a substantially half-ring-shaped part 142 having the inner surface 141 which is complementary to almost the half part of the periphery of the clamp nut 50 and which can be pressed against the periphery of the clamp nut 50. At the top end of the inner surface 141 of the substantially half-ring-shaped part 142 is provided an injection nozzle 144 connected to a lubricating oil supply path 143, which is connected to a lubricating oil supply source not shown in the drawing. In this case, the nut body 51 has an insertion hole 145 for inserting the injection nozzle 144, and the bottom of this insertion hole 145 is connected to a through hole 146 which extends to and reaches the thrust ring 52.

When the clamp nut body 51 is clamped to the collet chuck body 10, the lubricating oil supplied from the lubricating oil supply source passes through the lubricating oil supply path 143 and reaches the injection nozzle 144, passes through the through hole 146, and then is injected into the pores of the porous material which composes the thrust ring 52. Accordingly, it is possible to enhance the lubricating property between the tapered surfaces 56 and 102, and to reduce the friction coefficient. Therefore, it is possible to prevent the occurrence of seizure between the tapered surfaces 102 and 56. As a result, it is possible to hold the tool more firmly, and to enhance the tool-mounting accuracy.

Figure 9:
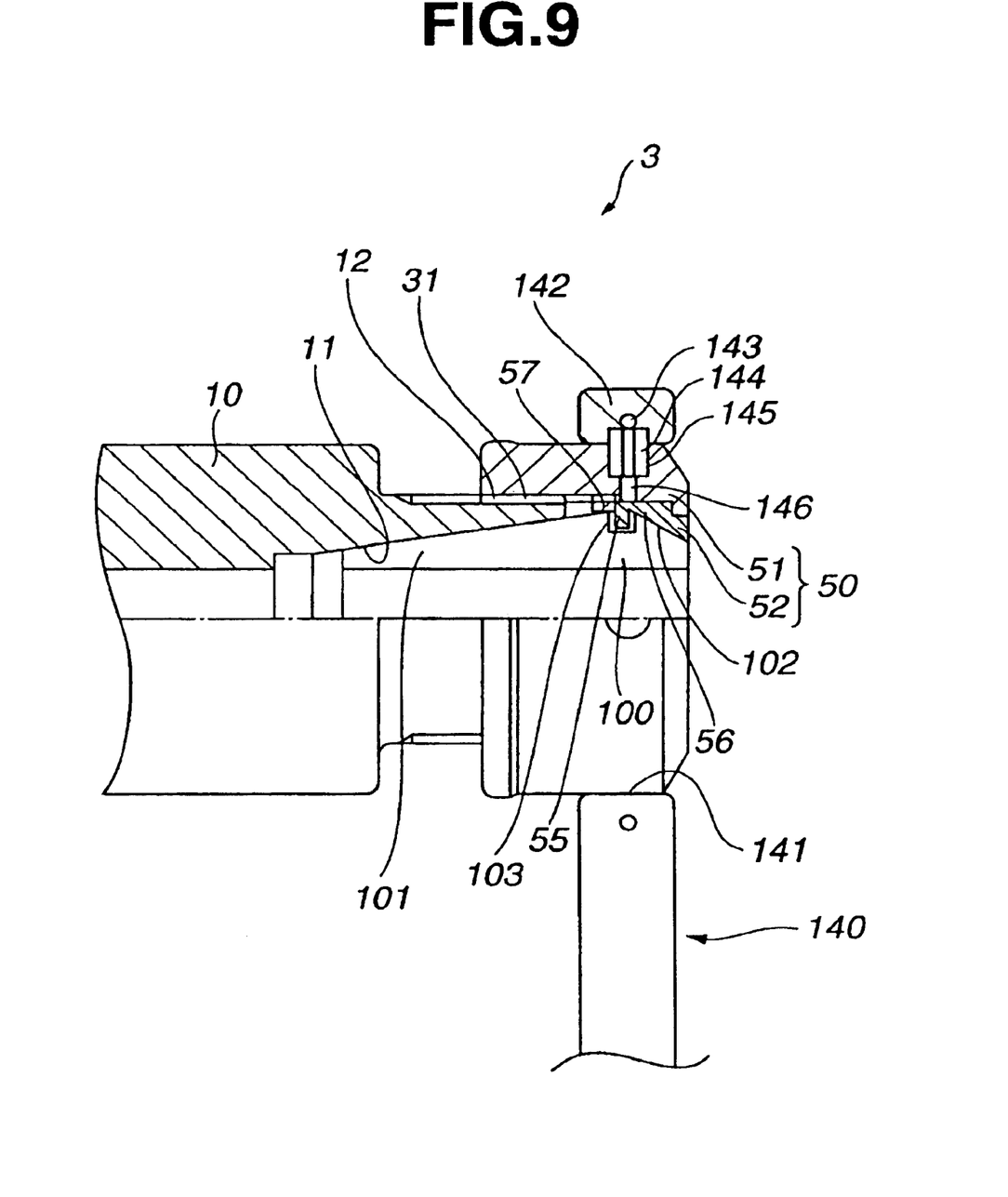
FIG. 9 is a partially sectional view of a collet chuck with a clamp nut according to still another embodiment of the present invention and is illustrative of the state in which the clamp nut is clamped to the collet chuck body.
Figure 10:
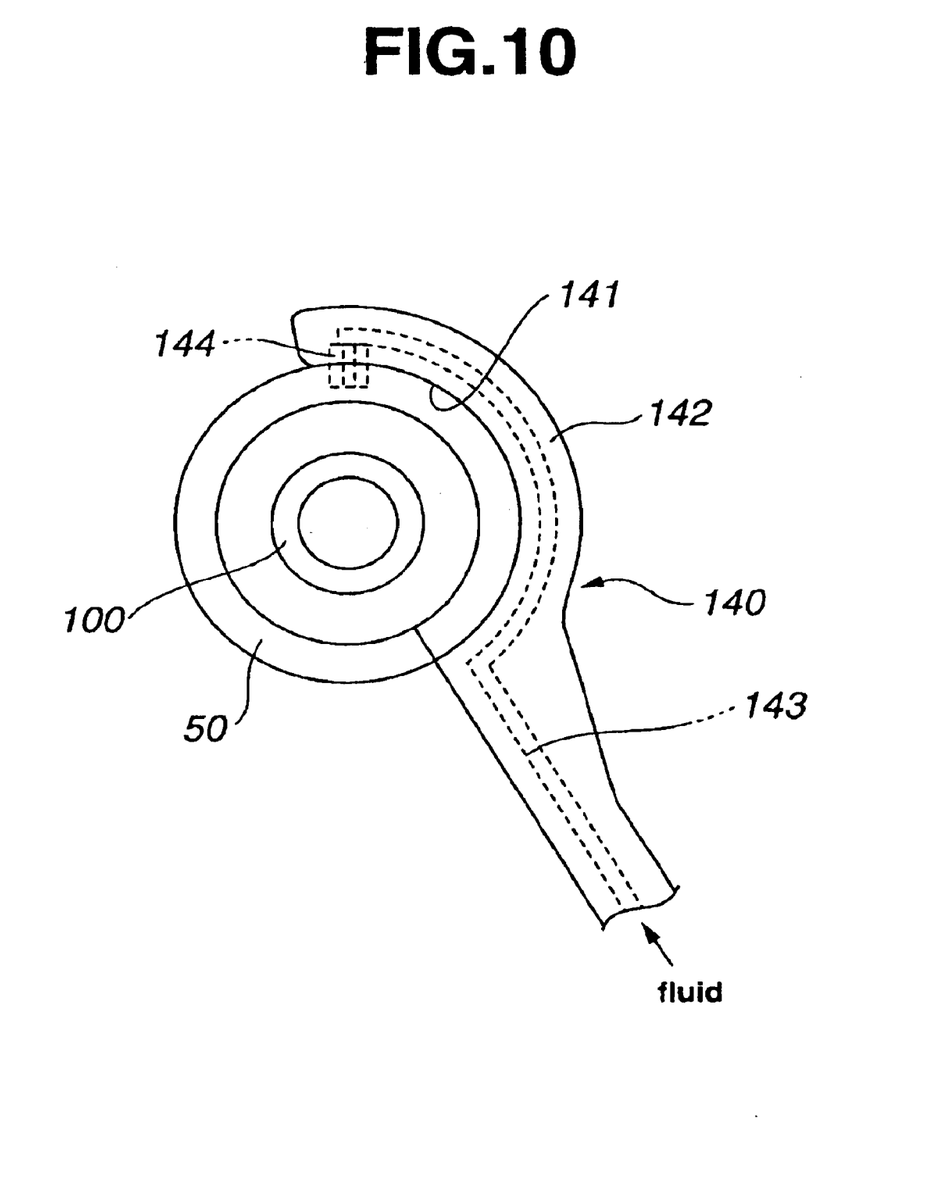
FIG. 10 is a right side view of the collet chuck of FIG. 9.

FIG. 9 is a partially sectional view of the collet chuck with the clamp nut according to this invention. FIG. 10 is a right side view of FIG. 9 in the state in which the clamp nut is clamped to the collet chuck body.

(Embodiment 4)

A clamp nut and a collet chuck with the clamp nut according to Embodiment 4 of this invention are hereinafter explained with reference to the relevant drawings. In Embodiment 4, elements similar to those of the collet chucks described in the aforementioned embodiments are given the same reference numerals as in the aforementioned embodiments, and any detailed description thereof is omitted.

Figure 4:
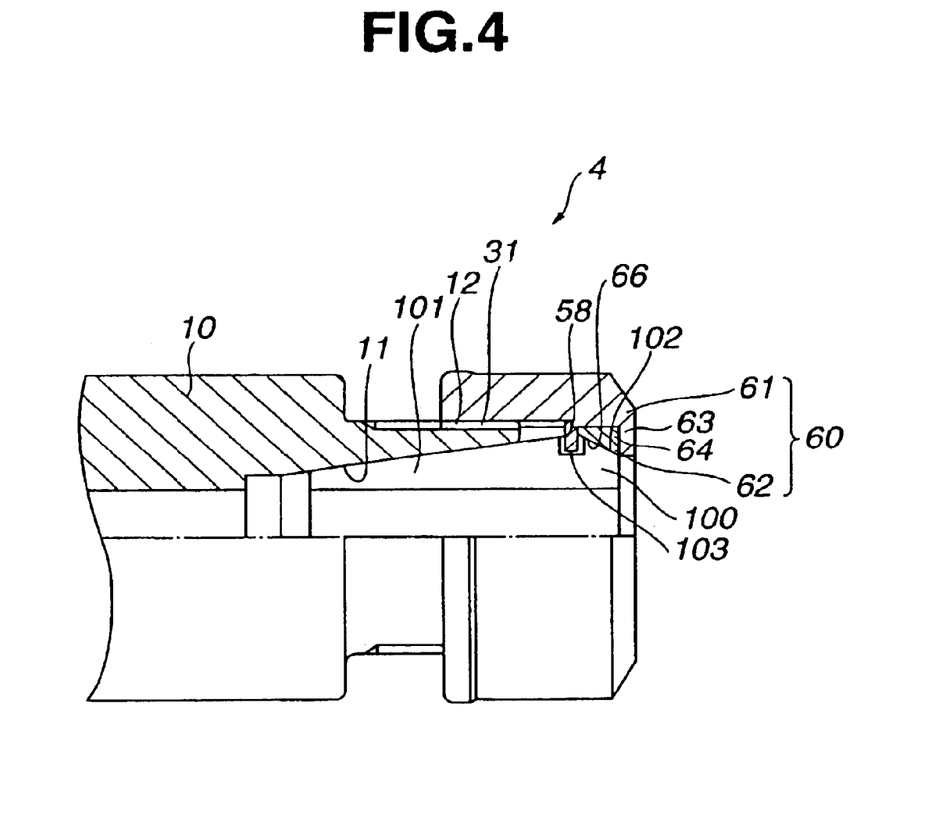
FIG. 4 is a partially sectional view of a collet chuck with a clamp nut according to Embodiment 4 of the present invention.

FIG. 4 is a partially sectional view of the collet chuck with the clamp nut according to Embodiment 4 of this invention.

As shown in FIG. 4, the main difference between a collet chuck 4 of Embodiment 4 and the collet chuck 3 of Embodiment 3 is the shapes of a nut body 61 and a thrust ring 62 which compose a clamp nut 60.

On the inner surface of the nut body 61 on the base-end side is formed a screw part 31 for engaging with a screw part 12 formed on the outer surface of a collet chuck body 10. The top-end side of the inner surface of the nut body 61 is formed as a projection 63 projecting toward the inside so as to make its inside diameter smaller. This projection 63 is constructed so as to come in contact with the top-end face 64 of the thrust ring 62 as described below in detail.

Moreover, at a part located almost in the center of the inner surface of the nut body 61 is provided a stopper ring 58 that comes in contact with the base-end face of the thrust ring 62. The inner surface side of this stopper ring 58 engages with an annular groove 103 of a tapered collet 100, with play, thereby making the nut body 61 and the thrust ring 62 rotatable.

The thrust ring 62 is entirely made of the aforementioned oil-bearing metal. This thrust ring 62 has a substantially trapezoidal sectional shape with its base-end side being shorter and its top-end side being longer. The inner surface of the thrust ring 62 is formed as a tapered surface 66 which is complementary to a tapered surface 102 of the tapered collet 100 and which is formed so as to make its inside diameter smaller toward the top-end side. The top-end face 64 of the thrust ring 62 is constructed so as to come in contact with the projection 63 of the nut body 61.

Specific actions of the collet chuck 4 of Embodiment 4 are hereinafter explained.

In the same manner as in Embodiment 3 described above, the tapered collet 100 with the thrust ring 62 and the nut body 61 attached thereto is caused to engage with the tapered hole 11 in the collet chuck body 10, and the thrust ring 62 and the nut body 61 are temporarily clamped to the collet chuck body 10. Subsequently, as the shank (not shown in the drawing) of the tool is inserted into the tapered collet 100 and the nut body 61 is rotated (or screwed), the projection 63 of the nut body 61 is pressed against the top-end face 64 of the thrust ring 62 toward the base-end side. Accordingly, the tapered surface 66 of the thrust ring 62 presses the tapered surface 102 of the tapered collet 100. As the width of the slots 101 becomes narrower, the diameter of the tapered collet 100 becomes smaller and the tapered collet 100 is pushed toward the base-end side of the tapered hole 11. As this contraction of the diameter proceeds, the thrust ring 62 stops rotating on the tapered collet 100 and slides toward the base-end side, and the nut body 61 rotates and slides on the thrust ring 62. Since the thrust ring 62 is made of the oil-bearing metal, it is possible to enhance the lubricating property of the interface between both the tapered surfaces 66 and 102 and to reduce the friction coefficient. Accordingly, it is possible to prevent the occurrence of seizure between the tapered surfaces 102 and 66. As a result, it is possible to hold the tool more firmly and to enhance the tool-mounting accuracy.

Concerning Embodiment 4, as with Embodiment 3, the case in which the thrust ring 62 is entirely made of the oil-bearing metal has been described. However, without limitation to such configuration, at least a part of the thrust ring 62 in contact with the tapered collet 100 may be made of the oil-bearing metal. As in the case of Embodiment 3, the nut body 61 and the thrust ring 62 may be integrated with each other.

Concerning Embodiment 4, as with Embodiment 3, the porous material with its pores previously filled with lubricating oil may be used for the thrust ring 62. It is possible to achieve effects similar to the above-described case by pouring lubricating oil from, for example, a lubricating oil supply device into the pores of the porous material which composes the thrust ring 62 when the nut body 61 is clamped to the collet chuck body 10.

(Embodiment 5)

A clamp nut and a collet chuck with the clamp nut according to Embodiment 5 of this invention are hereinafter explained with reference to the relevant drawings. In Embodiment 5, elements similar to those of the collet chucks described in the aforementioned embodiments are given the same reference numerals as in the aforementioned embodiments, and any detailed description thereof is omitted.

Figure 5:
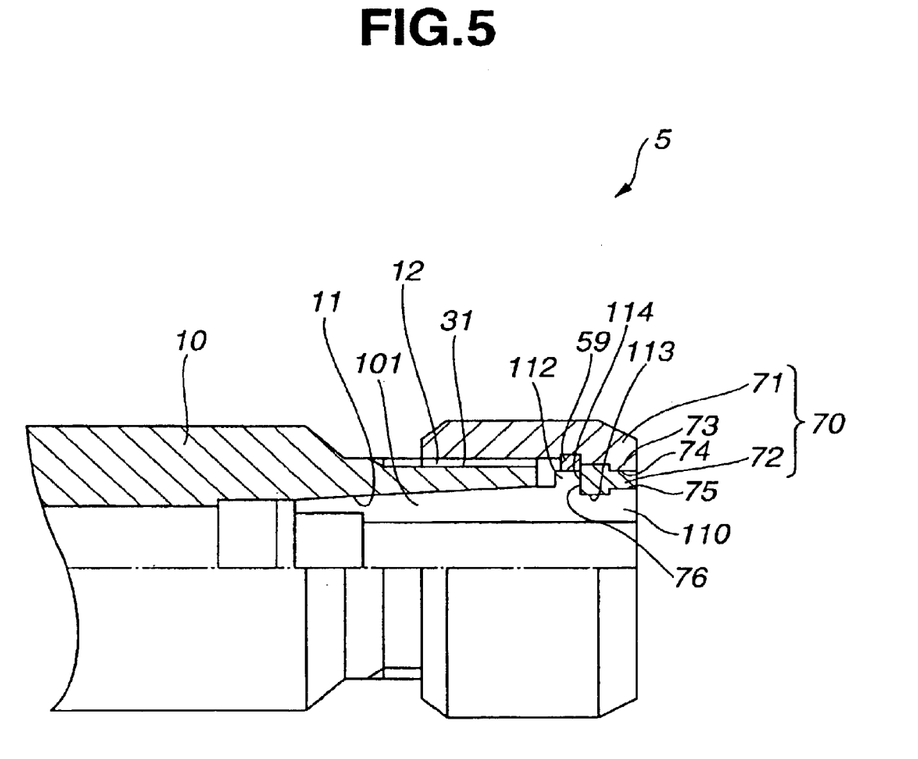
FIG. 5 is a partially sectional view of a collet chuck with a clamp nut according to Embodiment 5 of the present invention.

FIG. 5 is a partially sectional view of the collet chuck with the clamp nut according to Embodiment 5 of this invention.

As shown in FIG. 5, the main difference between a collet chuck 5 of Embodiment 5 and the collet chuck 2 of Embodiment 2 is the shape of a clamp nut 70. The clamp nut 70 of Embodiment 5 comprises a nut body 71 and a thrust ring 72 provided between a tapered collet 110 and the nut body 71.

On the inner surface of the nut body 71 on the base-end side is formed a screw part 31 for engaging with a screw part 12 formed on the outer surface of a collet chuck body 10. The top-end side of the inner surface of the nut body 71 is formed as a projection 73 projecting toward the inside so as to make its inside diameter smaller. This projection 73 is positioned on a stepped part 74 formed at the top end of the thrust ring 72 as described below in detail. Moreover, at a part located almost in the center of the inner surface of the nut body 71 is provided a stopper ring 59 that comes in contact with the base-end face 76 of the thrust ring 72, and the nut body 71 and the thrust ring 72 are rotatable.

The thrust ring 72 is entirely made of the aforementioned oil-bearing metal. This thrust ring 72 has a section shaped substantially in the letter "T" that comprises the stepped part 74 formed so as to make the outside diameter on the top-end side slightly smaller, and a stepped part 75 formed so as to make the inside diameter on the top-end side slightly larger. The projection 73 of the nut body 72 is located on the stepped part 74, and the top end of the tapered collet 110 is located on the stepped part 75. A portion of the thrust ring 72 adjacent to the base-end side of the stepped part 75 is inserted into an annular groove 113 of the tapered collet 110. The base-end face 76 of the thrust ring 72 comes in contact with a wall 114 of a flange 112 of the tapered collet 110.

Specific actions of the collet chuck 5 of Embodiment 5 are hereinafter explained.

In the same manner as in Embodiment 2 described above, the tapered collet 100 with the thrust ring 72 and the nut body 71 attached thereto is caused to engage with the tapered hole 11 in the collet chuck body 10, and the thrust ring 72 and the nut body 71 are temporarily clamped to the collet chuck body 10. Subsequently, as the shank (not shown in the drawing) of the tool is inserted into the tapered collet 110 and the nut body 71 is rotated (or screwed), the projection 73 of the nut body 71 presses the stepped part 74 of the thrust ring 72 toward the base-end side. Accordingly, the base-end face 76 of the thrust ring 72 presses the wall 14 of the flange 112 of the tapered collet 110. As the width of the slots 101 becomes narrower, the diameter of the tapered collet 110 becomes smaller and the tapered collet 110 is pushed toward the base-end side of the tapered hole 11. Since the thrust ring 72 is made of the oil-bearing metal, it is possible to enhance the lubricating property of the interface between both the thrust ring 72 and the outer surface of the tapered collet 110 on the top-end side and to reduce the friction coefficient. Accordingly, it is possible to prevent the occurrence of seizure between them. As a result, it is possible to hold the tool more firmly and to enhance the tool-mounting accuracy.

Concerning Embodiment 5 as in the cases of Embodiments 3 and 4, the case in which the thrust ring 72 is entirely made of the oil-bearing metal has been described. However, without limitation to such configuration, at least a part of the thrust ring 72 in contact with the tapered collet 110 may be made of the oil-bearing metal. As in the cases of Embodiments 3 and 4, the nut body 71 and the thrust ring 72 may be integrated with each other.

Concerning Embodiment 5, as with Embodiment 3, the porous material with its pores previously filled with lubricating oil may be used for the thrust ring 72. It is possible to achieve effects similar to the above-described case by pouring lubricating oil from, for example, a lubricating oil supply device into the pores of the porous material which composes the thrust ring 72 when the nut body 71 is clamped to the collet chuck body 10.

(Embodiment 6)

A clamp nut and a collet chuck with the clamp nut according to Embodiment 6 of this invention are hereinafter explained with reference to the relevant drawings. In Embodiment 6, elements similar to those of the collet chucks described in the aforementioned embodiments are given the same reference numerals as in the aforementioned embodiments, and any detailed description thereof is omitted.

Figure 6:
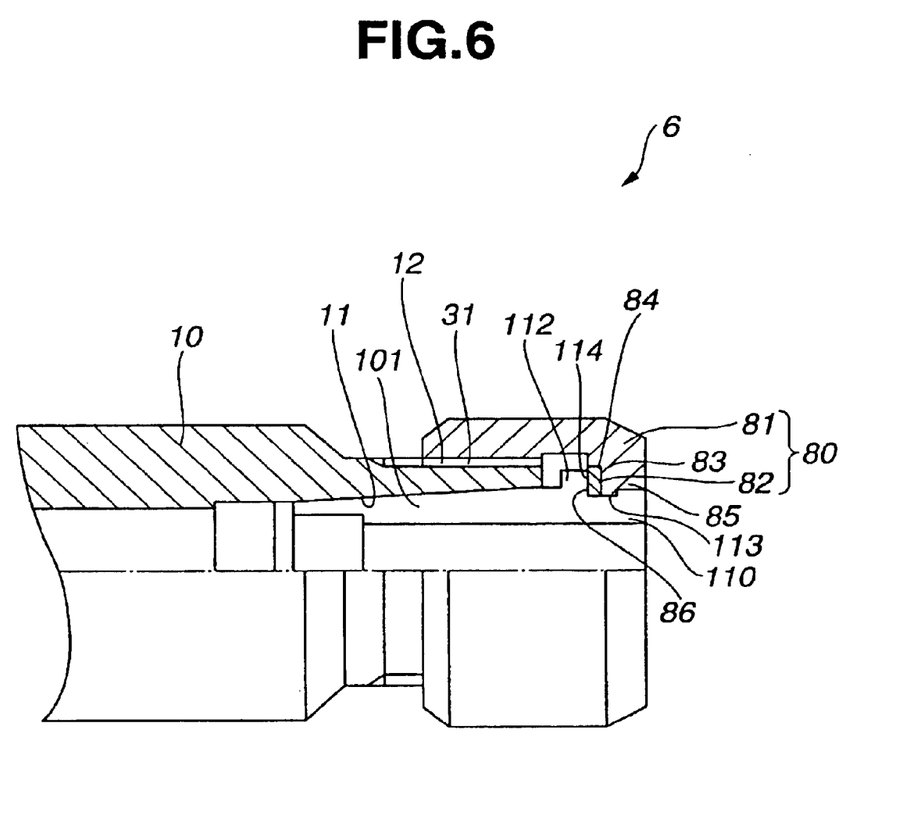
FIG. 6 is a partially sectional view of a collet chuck with a clamp nut according to Embodiment 6 of the present invention.

FIG. 6 is a partially sectional view of the collet chuck with the clamp nut according to Embodiment 6 of this invention.

As shown in FIG. 6, the main difference between a collet chuck 6 of Embodiment 6 and the collet chuck 2 of Embodiment 2 is the shape of a clamp nut 80. The clamp nut 80 of Embodiment 6 comprises a nut body 81 and a thrust ring 82 provided between a tapered collet 110 and the nut body 81.

On the inner surface of the nut body 81 on the base-end side is formed a screw part 31 for engaging with a screw part 12 formed on the outer surface of a collet chuck body 10. The top-end side of the inner surface of the nut body 81 is formed as a projection 83 projecting toward the inside so as to make its inside diameter smaller. On the base-end side of this projection 83 is formed a press-fit hole 84 for press-fitting the thrust ring 82 as described below in detail. Moreover, on the inner surface of the projection 83 is formed a convex part 85 to be inserted into an annular groove 113 of the tapered collet 110.

The thrust ring 82 is entirely made of the aforementioned oil-bearing metal. This thrust ring 82 has a substantially rectangular section and is press-fitted into the press-fit hole 84 of the nut body 81. The base-end face 86 of the thrust ring 82 comes in contact with a wall 114 of a flange 112 of the tapered collet 110.

Specific actions of the collet chuck 6 of Embodiment 6 are hereinafter explained.

The thrust ring 82 is first press-fitted into the press-fit hole 84 of the nut body 81. The nut body 81 with the thrust ring 82 press-fitted therein is then attached to the top end of the tapered collet 110 by contracting the diameter of the tapered collet 110. Then, the tapered collet 110 is caused to engage with the tapered hole 11 in the collet chuck body 10, and the nut body 81 with the thrust ring 82 press-fitted therein is temporarily clamped to the collet chuck body 10. Subsequently, as the shank (not shown in the drawing) of the tool is inserted into the tapered collet 110 and the nut body 81 is rotated (or screwed), the base-end face 86 of the thrust ring 82 is pressed against the wall 114 of the flange 112. Accordingly, as the width of the slots 101 becomes narrower, the diameter of the tapered collet 110 becomes smaller and the tapered collet 110 is pushed toward the base-end side of the tapered hole 11. Since the thrust ring 82 is made of the oil-bearing metal, it is possible to enhance the lubricating property of the interface between the thrust ring 82 and the outer surface of the tapered collet 110 on the top-end side and to reduce the friction coefficient. Accordingly, it is possible to prevent the occurrence of seizure between them. As a result, it is possible to hold the tool more firmly and to enhance the tool-mounting accuracy.

Concerning Embodiment 6 as in the cases of aforementioned embodiments, the case in which the thrust ring 82 is entirely made of the oil-bearing metal has been described. However, without limitation to such configuration, at least a part of the thrust ring 82 in contact with the tapered collet 110 may be made of the oil-bearing metal.

Concerning Embodiment 6, the case in which the thrust ring 82 is press-fitted into the nut body 81 has been described. However, without limitation to such configuration, the thrust ring 82 may be placed at a desired position on the nut body 81 by using an adhesive or may be formed as a separate unit.

As described above, the clamp nut and the collet chuck therewith according to this invention can enhance the lubricating property of the sliding surfaces of the clamp nut and the collet and can reduce the friction coefficient. Accordingly, it is possible to prevent the occurrence of seizure on the sliding surfaces and to enhance durability. Therefore, the clamp nut and the collet can rotate without generating vibrations due to imbalance. Moreover, in the case of normal rotation, beyond question, and even in the case of high-speed rotation, it is possible to maintain the tool-mounting accuracy for a long period of time.

What is claimed is:

1. A clamp nut for clamping a collet chuck body and a collet together, the clamp nut being mounted on the collet chuck body for holding a tool in the collet, wherein at least a part of the clamp nut in contact with the collet is made of a porous material, and pores of the porous material are filled with a fluid.

2. The clamp nut according to claim 1, wherein the fluid is injected into the pores.

3. The clamp nut according to claim 1, wherein the fluid is injected from the external surface of the clamp nut at a time of clamping the clamp nut.

4. The clamp nut according to claim 1, wherein the fluid is lubricating oil.

5. The clamp nut according to claim 1, wherein the fluid is lubricating oil and is injected into the pores.

6. The clamp nut according to claim 1, wherein the fluid is lubricating oil, is poured from an external surface of the clamp nut at a time of clamping the clamp nut, and is injected into the pores.

7. The clamp nut according to claim 1, wherein the entire clamp nut is made of the porous material and the pores of the porous material are filled with the fluid.

8. The clamp nut according to claim 1, wherein the entire clamp nut is made of the porous material and the fluid is poured from the external surface of the clamp nut into and fills the pores of the porous material.

9. The clamp nut according to claim 1, comprising a nut body and a thrust ring provided between the collet and the nut body, wherein at least a part of the thrust ring in contact with the collet is made of the porous material, and the pores of the porous material are filled with the fluid.

10. The clamp nut according to claim 1, comprising a nut body and a thrust ring provided between the collet and the nut body, wherein at least a part of the thrust ring in contact with the collet is made of the porous material, and the pores of the porous material are filled with the fluid at a time of clamping the clamp nut.

11. The clamp nut according to claim 1, comprising a nut body and a thrust ring, the thrust ring being provided between the collet and the nut body and the thrust ring being entirely made of the porous material, wherein the pores of the porous material are filled with the fluid.

12. The clamp nut according to claim 1, comprising a nut body and a thrust ring provided between the collet and the nut body and made of the porous material in its entirety, wherein the pores of the porous material are externally filled with the fluid at a time of clamping the clamp nut.

13. The clamp nut according to claim 1, comprising a nut body and a thrust ring provided between the collet and the nut body, wherein at least a part of the thrust ring in contact with the collet is made of the porous material, and the pore of the porous material are filled with the fluid, and wherein the nut body is mounted in a manner capable of rotating and sliding on the thrust ring.

14. The clamp nut according to claim 1, comprising a nut body and a thrust ring, the thrust ring being provided between the collet and the nut body and the thrust ring being made of the porous material in its entirety, wherein the pores of the porous material are filled with the fluid, and wherein the nut body is mounted in a manner capable of rotating and sliding on the thrust ring.

15. The clamp nut according to claim 1, comprising a nut body and a thrust ring provided between the collet and the nut body, wherein at least a part of the thrust ring in contact with the collet is made of the porous material, and the pores of the porous material are filled with the fluid, and wherein the nut body is integrated with the thrust ring.

16. The clamp nut according to claim 1, comprising a nut body and a thrust ring, the thrust ring being provided between the collet and the nut body and the thrust ring being made of the porous material in its entirety, wherein the pores of the porous material are filled with the fluid, and wherein the nut body is integrated with the thrust ring.

17. A collet chuck comprising a collet chuck body for holding a tool in a collet, and a clamp nut for clamping the collet chuck body and the collet together, the clamp nut being mounted on the collet chuck body for holding a tool in the collet, wherein at least a part of the clamp nut in contact with the collet is made of a porous material, and pores of the porous material are filled with a fluid.

18. The collet chuck according to claim 17, wherein the clamp nut comprises a nut body and a thrust ring provided between the collet and the nut body, wherein at least a part of the thrust ring in contact with the collet is made of the porous material, and the pores of the porous material are filled with the fluid.

19. The collet chuck according to claim 17, wherein the clamp nut comprises a nut body and a thrust ring provided between the collet and the nut body, wherein at least a part of the thrust ring in contact with the collet is made of the porous material, and the pores of the porous material are filled with the fluid, and wherein the nut body is mounted in a manner capable of rotating and sliding on the thrust ring.

20. The collet chuck according to claim 17, wherein the clamp nut comprises a nut body and a thrust ring provided between the collet and the nut body, wherein at least a part of the thrust ring in contact with the collet is made of the porous material, and the pores of the porous material are filled with the fluid, and wherein the nut body is integrated with the thrust ring.

* * * * *